(12) United States Patent
Tyrrell et al.

(10) Patent No.: US 7,661,562 B2
(45) Date of Patent: Feb. 16, 2010

(54) MICRO POWERED DISPENSING DEVICE

(75) Inventors: David J. Tyrrell, Decatur, GA (US);
Kim Ellefson, Oshkosh, WI (US); Eric F. Wagner, Sherwood, WI (US); Jeffrey D. Lindsay, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 502 days.

(21) Appl. No.: 11/247,119

(22) Filed: Oct. 11, 2005

(65) Prior Publication Data

US 2007/0080172 A1    Apr. 12, 2007

(51) Int. Cl.
*B67D 5/62* (2006.01)
*B67D 5/60* (2006.01)
*B67D 5/08* (2006.01)

(52) U.S. Cl. .................. 222/146.5; 222/136; 222/145.5

(58) Field of Classification Search .............. 222/146.5, 222/146.3, 146.2, 135, 136, 145.5; 429/12; 200/600

See application file for complete search history.

(56) References Cited

U.S. PATENT DOCUMENTS

| | | | |
|---|---|---|---|
| 3,796,186 A | 3/1974 | Bounds et al. | |
| 4,211,959 A * | 7/1980 | Deavenport et al. | ......... 315/362 |
| 4,349,131 A | 9/1982 | Arabian | |
| 4,541,132 A | 9/1985 | Long | |
| 4,549,243 A | 10/1985 | Owen et al. | |
| 4,561,037 A | 12/1985 | MacLaine et al. | |
| 4,649,895 A | 3/1987 | Yasuki et al. | |
| 4,663,639 A | 5/1987 | Owen et al. | |
| 4,965,977 A | 10/1990 | White | |
| 5,121,884 A | 6/1992 | Noakes | |
| 5,184,778 A | 2/1993 | Noakes | |
| 5,222,664 A | 6/1993 | Noakes et al. | |
| 5,251,416 A | 10/1993 | White | |
| 5,443,569 A | 8/1995 | Uehira et al. | |
| 5,513,771 A * | 5/1996 | Cote | ........................... 221/75 |
| 5,626,936 A | 5/1997 | Alderman | |
| 5,636,922 A | 6/1997 | Clark | |
| 5,810,265 A | 9/1998 | Cornelius et al. | |
| 5,813,576 A | 9/1998 | Iizuka et al. | |
| 5,825,975 A | 10/1998 | Privas | |
| 5,895,418 A | 4/1999 | Saringer | |
| 5,927,618 A | 7/1999 | Jefferies et al. | |
| 5,932,011 A | 8/1999 | Noakes et al. | |

(Continued)

FOREIGN PATENT DOCUMENTS

DE    4224005    1/1994

(Continued)

OTHER PUBLICATIONS

English Abstract of DE 4224005 published Jan. 27, 1994.

(Continued)

*Primary Examiner*—J. Casimer Jacyna
(74) *Attorney, Agent, or Firm*—Dority & Manning, P.A.

(57) ABSTRACT

A liquid dispenser includes a reservoir for holding a liquid, and a chamber in communication with the reservoir. The chamber receives the liquid, and a micro power source generates electricity for heating the liquid disposed in the chamber. A nozzle is included for releasing the heated liquid from the chamber through an orifice in the nozzle.

29 Claims, 6 Drawing Sheets

U.S. PATENT DOCUMENTS

| | | | |
|---|---|---|---|
| 5,932,940 A | 8/1999 | Epstein et al. | |
| 6,079,634 A | 6/2000 | Noakes et al. | |
| 6,138,671 A | 10/2000 | Noakes et al. | |
| 6,311,868 B1 * | 11/2001 | Krietemeier et al. | 222/1 |
| 6,311,903 B1 | 11/2001 | Gaw et al. | |
| 6,318,647 B1 | 11/2001 | Gaw et al. | |
| 6,326,097 B1 | 12/2001 | Hockaday | |
| 6,376,444 B1 | 4/2002 | Hortel et al. | |
| 6,392,313 B1 | 5/2002 | Epstein et al. | |
| 6,454,127 B1 | 9/2002 | Suomela et al. | |
| 6,517,648 B1 | 2/2003 | Bouchette et al. | |
| 6,541,149 B1 | 4/2003 | Maynard et al. | |
| 6,589,294 B2 | 7/2003 | Hortel et al. | |
| 6,689,466 B2 | 2/2004 | Hartmann | |
| 6,703,127 B2 | 3/2004 | Davis et al. | |
| 6,817,753 B2 * | 11/2004 | Buenger et al. | 366/336 |
| 6,864,010 B1 | 3/2005 | McLean | |
| 2001/0029911 A1 | 10/2001 | Yang et al. | |
| 2002/0061954 A1 | 5/2002 | Davis et al. | |
| 2002/0108965 A1 | 8/2002 | Hill et al. | |
| 2003/0053643 A1 | 3/2003 | Bank et al. | |
| 2004/0101729 A1 * | 5/2004 | Kearl | 429/30 |
| 2004/0250545 A1 * | 12/2004 | Tilston | 60/670 |
| 2006/0073368 A1 * | 4/2006 | Chiu | 429/31 |
| 2006/0112635 A1 * | 6/2006 | Yang et al. | 48/61 |
| 2006/0134498 A1 * | 6/2006 | Hamm et al. | 429/37 |
| 2006/0204802 A1 * | 9/2006 | Specht | 429/22 |

FOREIGN PATENT DOCUMENTS

| | | |
|---|---|---|
| EP | 1113518 A1 | 7/2001 |
| JP | 54058954 | 5/1979 |
| WO | WO 9944254 | 9/1999 |
| WO | WO 0029535 | 5/2000 |
| WO | WO 2004094906 A2 | 11/2004 |

OTHER PUBLICATIONS

International Search Report dated Oct. 17, 2006 related to PCT/US2006/016906.

English language abstract of Japanese Patent No. JP54058954, published May 12, 1979.

Conair HLD 20 Information listed at the website http://www.comforthouse.com/comfort/handlotion.html, May 23, 2005.

Conair HLM11CH Information listed at the website http://www.comforthouse.com/comfort/shavingcream.html, May 23, 2005.

Hotstrokes® Information listed at the website http://www.thermalcomfortinc.com/instructions.asp, May 23, 2005.

Pacific Northwest National Library paper entitled "Microheater" ca. Jul. 21, 1999, by Drost et al.

* cited by examiner

MICRO POWERED DISPENSING DEVICE

BACKGROUND OF THE INVENTION

Consumers use a variety of devices that deliver skin care products such as shaving cream and lotions. Shaving cream dispensers, for instance, can deliver heated shaving cream to help soften beard stubble before shaving. Similarly, lotion dispensers can deliver heated lotion for skin comfort as well as for activating and delivering therapeutic or medicinal ingredients in the lotion. However, these and other conventional skin care product dispensers use well-known power generation components such as alkaline batteries and electrical power cords. If battery power is used, the batteries tend to be depleted rapidly and must be replaced regularly, which is costly over time. If conventional electrical power is used, electrical cords prevent portability of the skin care product dispensers.

A device is needed in the industry, which utilizes a compact, portable power source that enables a user to transport a skin care product dispenser conveniently in a purse, pocket, suitcase or the like, and which can be quickly and economically recharged.

BRIEF SUMMARY OF THE INVENTION

The present invention generally provides micro powered skin care product dispensers such as those that dispense lotions, shaving creams, hair care products and other toiletries. A micro power source facilitates portability of the skin care product dispensers by eliminating electrical power cords in some embodiments and bulky motors in other embodiments while providing direct heat generation or electrical power in the skin care product dispensers, with the energy being obtained from the reaction of a fuel with oxygen. In some versions of the invention, the energy for heating the liquid is selectively applied to the portion of the liquid that will be dispensed next (e.g., the liquid nearest the discharge point or the liquid as it passes through a discharge chamber). In one version, the heat is generated on demand, during or shortly before dispensing of the product, such as in response to a user action indicative of a desire to dispense the liquid (e.g., depressing a dispensing head or a button). The amount of heating (product temperature) may be determined by user-adjustable settings such as a dial to control the heat delivering from the micro power source. The component parts of the micro powered skin care product dispensers can be simple and economical to manufacture, assemble and use. Other advantages of the invention will be apparent from the following description and the attached drawings, or can be learned through practice of the invention.

As used herein, the term "micro power source" includes any type of micro-fuel cell, micro-gas turbine (micro engine), microheater, or their combinations, which may, for example, deliver 10 to 100 times as much energy as conventional batteries occupying the same volume. The micro power source can deliver power to devices of the present invention from about 0.2 Watts (W) to 2000 W, more particularly from about 0.5 W to about 200 W. Further, the micro power source according to various aspects of the present invention can be readily rechargeable by simply adding fuel to an empty fuel cartridge or replacing a spent fuel cartridge as will be described in detail in the following discussion.

More specifically, the micro-fuel cells according to various embodiments described herein are devices that electrochemically oxidize a fuel to generate electricity. Exemplary methods of coupling micro-fuel cells with portable electrical devices are described and shown, for example but without limitation, in U.S. Pat. No. 6,326,097 to Hockaday, which is incorporated herein by reference.

The micro-gas turbines contemplated in various embodiments herein generally include a miniature compressor that compresses incoming air to high pressure, a combustion area that burns the fuel and produces high-pressure, high-velocity gas, and a tiny turbine that extracts the energy from the high-pressure, high-velocity gas flowing from the combustion chamber, which is then converted to electricity. Examples of microturbines that convert fuel to electricity are found in U.S. Pat. No. 5,932,940 to Epstein et al. and U.S. Pat. No. 6,392,313 to Epstein et al., which are incorporated herein by reference without limitation.

The microheater used in various embodiments described herein is a microscale heating system that can be used for personal or portable heating and cooling devices. The microheater has the capability of producing up to 30 W of thermal energy per square centimeter of external combustor area and can heat a portable heater for as long as eight hours on minimal fuel. Exemplary microheater applications are described by Drost et al. in a Pacific Northwest National Laboratory paper entitled *MicroHeater*, ca. Jul. 21, 1999, which is incorporated herein and without limitation by reference thereto.

Another example of fuel cell technology, which can be used in various embodiments of the present invention is a hydrogen-based fuel cell system, which is available for instance but without limitation from Angstrom Power Solutions (North Vancouver, British Columbia, Canada). Such a system is described, for example, in U.S. Pat. No. 6,864,010, to McLean, which is incorporated by reference. The hydrogen-based fuel cell system uses compressed hydrogen gas in cartridges or metal hydride storage systems. A proton exchange membrane with a porous diffusion material and catalyst generates electricity from the reaction of oxygen and hydrogen, with an optional hybrid battery connected to the fuel cell. The fuel cell can be cylindrical, as in the shape of existing AA lithium batteries, or can have a prismatic shape. For example, an Angstrom V50 cylindrical fuel cell is 2.6 cosmetic in diameter and 2 cm long, producing 1 W at 5 volts. A V60 fuel cell is a prismatic fuel cell with dimensions of 5 mm×27 mm×19 mm. As presented at the 7th Annual Small Fuel Cell 2005 Conference, Washington, D.C., Apr. 27-29, 2005, Angstrom fuel cells may deliver energy of 700 Whr/liter or 170 Whr/kg at 50% net efficiency.

As used herein, the term "fluid" means a liquid or a gas.

As used herein, the term "solution" means a liquid comprising a solvent and one or more solutes and can be aqueous or nonaqueous. A solution may be combined with other phases to form an emulsion, a slurry, a foam, and so forth. The solution can comprise water, cleaning agents, various active ingredients, fragrance additives or agents and the like.

As used herein, the term "controller" means a regulator, a control assembly or a control used to activate a resistor or other electrically powered device.

With particular reference to the micro-fuel cell form of a micro power source, the micro-fuel cell can generate and deliver energy to skin care product dispenser extremely efficiently. The micropower source, whether it is a micro-fuel cell or a small heating device, can use a fuel to generate the energy in a controlled manner either in the form of heat or electricity or both. For example, the fuel can generate the energy by controlled oxidation in the presence of catalysts. If the energy is heat, a workpiece can be heated directly. If the energy produced is electricity, the electricity can be used for resistive heating or to activate the workpiece. Of course, when electricity is produced, a portion of the energy produced by the fuel will be released as waste heat, which can be captured and utilized in various aspects of the invention.

The delivery of energy can be during dispensing of the product or shortly before (e.g., about 5, 10, 20, or 30 seconds before), and can be initiated by an action by the user such as an attempt to dispense the product, squeezing the sides of the container, depressing a button or switch, etc. In one version, heating is rapid enough that it can be done on demand without significant waits for the liquid to become warmed.

The micro-fuel cell can be but is not limited to a polymer electrolyte membrane (PEM) cell, a direct methanol cell (DMFC—a form of PEMFC discussed below), a phosphoric acid cell, an alkaline cell, a molten carbonate cell, a solid oxide cell, and a regenerative (reversible) micro-fuel cell. Other types of micro-fuel cells may include small MEMS (micro electrical machined system) devices, which are also suitable for electrical power applications. The MEMS-based fuel cell can be a solid oxide type (SOFC), a solid polymer type (SPFC), or a proton exchange membrane type (PEMFC). Each MEMS micro-fuel cell can have an anode and a cathode separated by an electrolyte layer. Additionally, catalyst layers can also separate the electrodes (cathode and anode) from the electrolyte as discussed below.

By way of more specific example, the PEM micro-fuel cells use a membrane to separate the fuel from the oxygen. A catalyst such as platinum may be present on, in, or otherwise associated with the membrane to help generate hydrogen ions from the fuel in the presence of an electrochemical circuit that receives an electron as a hydrogen ion is generated. The membrane, typically wetted with water, allows hydrogen ions from the fuel to diffuse toward the oxygen where it reacts electrochemically. The overall reactions involved may be, in the case of methanol fuel cell:

$$CH_3OH+H_2O \rightarrow CO_2+6H^++6e^-$$

$$6H^++3/2O_2+6e^- \rightarrow 3H_2O$$

The flow of electrons across the circuit occurs at a voltage that can be used to conduct useful work; i.e., to power cleaning devices as described herein.

By way of further example but not of limitation, a micro-fuel cell in another aspect of the invention can be made from two silicon substrates. Porous silicon is formed along the surface of the substrate in a desired pattern provided by a mask. Suitable mask materials include those that do not dissolve in HF, e.g., silicon nitride, gold and chromium. Ambient mask conditions are next changed to provide electropolishing to form gas delivery tunnels or channels underlying the porous regions. A variety of patterns are suitable for these tunnels or channels such as serpentine, parallel, wheel and spoke or fractal patterns. The mask provides a final structure in which the porous silicon regions are supported, typically by portions of the mask itself. The resulting structure provides porous silicon regions formed in the surface of the substrate, with underlying tunnel regions formed within the substrate.

In this exemplary micro-fuel cell, two silicon current collector/gas diffusion structures are prepared as described above. A catalyst layer is then formed on each silicon structure (on the surface in which the porous silicon regions are formed) for both electrodes. The catalyst layer is formed by any suitable technique, e.g., sputtering or spinning an emulsion of catalyst particles. The catalyst layer can be, for example, platinum or platinum/carbon (e.g., carbon particles having attached platinum particles). Additionally, a platinum/ruthenium catalyst is useful for reacting with methanol fuel, although the Pt—Ru is generally only used for the catalyst layer in contact with the fuel, with a different catalyst used on the oxidant side of the cell. The catalyst layer is electrically conductive (i.e., at least 1 ohm$^{-1}$cm$^{-1}$) and is in electrical contact with the silicon current collector.

On one of the foregoing substrates, a proton exchange membrane is formed on the catalyst layer. As used herein, the term "proton exchange membrane" indicates any suitable material that allows ions to conduct across it. Forming the proton exchange membrane encompasses in situ techniques such as spin or solution casting, as well as providing a preformed film onto the catalyst. An exemplary membrane for use in this construction is the Nafion® brand membrane sold by the Dupont® company. Specifically, the Nafion® brand membrane is a perfluorosulfuric acid membrane with a polytetrafluoroethylene backbone.

Those skilled in the art will appreciate that other films are commercially available and suitable for use as the membrane. For example, but not by way of limitation, modified Nafion® brand membranes can be obtained by treatment with electron beams or chemical modification (e.g., addition of a polybenzimidazole layer applied with screen printing or other printing techniques). The membrane can also contain exfoliated clays or hydrocarbons.

The selected membrane is next formed on the catalyst layer by liquid phase techniques, e.g., spin casting or solution casting, or by assembly of a pre-cast film. The membrane thickness ranges from about 10 to about 50 μm. In the case of a pre-cast film, the catalyst material is generally painted onto the film, e.g., as an ink containing the catalyst, alcohols, and the membrane polymer.

It should be understood that there is no well-defined boundary between the catalyst layer and the membrane. For example, in the case of spin or solution casting, the catalyst layer surface generally has some texture, and casting of the membrane layer on such a textured surface causes the ionically conducting polymer to move into such textured regions, e.g., into local valleys of the catalyst layer. Painting a catalyst material onto a pre-cast membrane provides a similar result.

To finish forming the micro-fuel cell, one of the above-described electrode structures is placed on the other electrode structure such that the catalyst layer of the second substrate contacts the proton exchange membrane. Generally, a PTFE or solubilized form of the proton exchange membrane is used to bond the catalyst layer to the membrane, followed by a heat treatment to drive off alcohol and solvents.

As constructed above, the micro-fuel cell operates as follows: fuel, e.g., hydrogen or methanol, is introduced into the first current collector (the anode) by directing the fuel through the tunnels such that it diffuses through the porous gas-diffusion regions to the catalyst layer. The catalyst layer promotes formation of hydrogen ions from the fuel, releasing electrons. The electrons flow from the catalyst layer through the anode current collector and through an external circuit, while the hydrogen ions (i.e., protons) move across the membrane toward the second catalyst layer (the cathode catalyst).

In this micro-fuel cell, an oxidant, e.g., air or oxygen, is directed into the tunnels of the cathode current collector, and diffuses through the gas-diffusion porous regions to the second catalyst layer. At this second catalyst layer, oxygen from the oxidant reacts both with the hydrogen ions flowing across the membrane and with the electrons flowing to the catalyst layer from the external circuit to form water. As noted above, this electron flow provides the desired current, and the water by-product is removed from the cell.

With reference now to the direct methanol fuel (DMFC) cell briefly introduced above, an exemplary DMFC cell includes a 13 W fuel cell operating at 15V that can operate for about 10 hours on approximately 100 ml of fuel. Another exemplary DMFC is thumb-sized: about 22 mm×about 56 mm×about 4.5 mm with 1.6 g of methanol fuel in its tank and has an overall mass of about 8.5 g. This micro-fuel cell provides about 20 hours of power at 100 mW for operation of, for example, a heating device using just 2 cc of fuel.

By way of further example, an active micro-fuel cell can provide 1 W of power for about 20 hours with approximately 25 cc of fuel. With the 25 cc methanol fuel cartridge in place, its weight is only about 130 g, with a size of about 100 mm×about 60 mm×about 30 mm (about 140 cc volume). This is equivalent to 6 lithium-ion batteries (3.7V and 600 mAh) that are currently used, for instance, in cellular phones By way of further example, Los Alamos National Laboratory (LANL) at Los Alamos, N. Mex. has developed micro-fuel cells such as a 100 $cm^2$ fuel cell for the U.S. Department of Energy and a 19.6 $cm^2$ fuel cell (250 g, 340 W/kg, 25 W nominal and 75-85 W peak power).

Many of the foregoing exemplary micro-fuel cells can use a variety of fuels, e.g., ethyl alcohol, methanol, formic acid, butane, or other fuel sources to produce electrical power. The skilled artisan will instantly recognize that the fuels need not be methanol or other volatile fuels, but can also be non-volatile such as the borohydride—alkaline solutions combined with alcohols provided by Medis Technologies of New York City, N.Y.

A variety of solid oxide fuel cells (SOFCs) can also be used as the micro-fuel cells. In an SOFC, a solid oxide electrolyte is used in combination with a compatible anode and a cathode material. Such an SOFC generates electricity and heat by directly converting the chemical energy of a fuel (hydrogen, hydrocarbons) with an oxidant ($O_2$, air) via an electrochemical process. The SOFC makes use of the property of certain solid-state oxide electrolytes to support a current of oxygen anions; for example, stabilized zirconia or related oxygen-ion conductors.

Also in the SOFC, the electrolyte membrane separates the fuel and oxidant with the cathode side in contact with the oxidant and the anode side in contact with the fuel. Oxygen from the oxidant stream is reduced to $O^{2-}$ anions at the cathode. These anions are transported through the solid electrolyte to the anode side of the cell. At the anode, the $O^{2-}$ ions are reacted with the fuel stream thus releasing electrons to flow back to the cathode. A secondary device in accordance with certain aspects of the present invention can be inserted into the circuit between the anode and cathode to draw useful work from the flow of electrons generated.

In addition to the above-described micro-fuel cells, other fuel cell technologies are suitable for use in various embodiments of the present invention. For example, a methanol fuel cell is available from CMR Fuel Cells, Ltd. of Harston, Cambridge, United Kingdom, which does not require the flow plates used by some fuel cells (compare SOFC above) to keep the fuel and the oxygen separated; i.e., the CMR fuel cell allows operation with mixed fuel and oxygen. Yet other suppliers of micro-fuel cells include Smart Fuel Cell GmbH of Germany, Samsung of South Korea and Microcell of Raleigh, N.C. In particular, the Microcell-PE methanol fuel cells are useful for powering portable devices requiring sub-watt to 100 W power.

In light of the above exemplary micro power sources, according to a particular aspect of the invention, a skin care liquid product dispenser includes a reservoir being configured to hold a liquid; a chamber in communication with the reservoir, the chamber being configured to receive the liquid; a micro power source being configured to generate energy for heating of the liquid disposed in the chamber; and a nozzle defining an orifice therethrough in selective communication with the chamber, the nozzle being configured for releasing the heated liquid from the chamber through the orifice. Also in this aspect the liquid can be a quantity of lotion, a quantity of skin care composition, a quantity of shaving cream and combinations of these and other liquids.

Further in this aspect of the invention, the micro power source can generate about 0.2 W to about 200 W. The micro power source can be a fuel cell having a fuel cartridge and a combustion chamber, the fuel cartridge being configured to hold a supply of fuel, the combustion chamber being configured to receive and combust the fuel to generate the energy. The supply of fuel can generate an electrochemical reaction to generate the energy.

The fuel cartridge is refillable with a replacement supply of fuel in this aspect, or the fuel cartridge can be a replaceable fuel cartridge.

The micro power source can further include a microturbine engine including a plurality of diffuser vanes and a plurality of compressor blades, the plurality of compressor blades being configured for rotation about the diffuser vanes to generate electricity.

Also in this aspect of the invention, the liquid dispenser can includes a controller in communication with the micro power source, the controller being configured to activate the micro power source to generate the energy. The controller can be a conductivity contact being configured to activate the micro power source by a user touch. Moreover, the controller can be configured to adjust a temperature of the liquid. The controller can also be configured to control a level of electrical power produced by a fuel cell. Still further in this aspect, the controller can be configured to selectively apply the energy to a portion of the liquid about to be dispensed.

Also in this aspect of the invention, the liquid dispenser can have an electrical device in communication with the micro power source, the electrical device disposed proximate the chamber and configured for heating the liquid. The electrical device can be a heating element in this aspect.

Still further in this aspect of the invention, the liquid dispenser can include an actuator interposed between the chamber and the orifice, the regulator being configured to release the liquid from the chamber through the orifice.

In another aspect of the invention, a liquid dispenser can include a first reservoir being configured to hold a liquid; a second reservoir being configured to hold a skin care composition; a chamber in communication with the first and the second reservoirs, the chamber being configured to receive the liquid and the skin care composition for mixing of the liquid and the skin care composition; a micro power source being configured to generate energy for conversion of at least one of the liquid and the skin care composition disposed in the chamber; and a nozzle defining an orifice therethrough in selective communication with the chamber, the nozzle being configured for releasing the liquid and the skin care composition from the chamber through the orifice. The liquid in this aspect can be a quantity of shaving cream, a quantity of lotion and combinations of these and other consumer products. The skin care composition can be a quantity of water, a quantity of fragrance, a quantity of thermoactivated dye, a quantity of wax and combinations of these products and liquids.

Still further in this aspect of the invention, the micro power source can generate about 0.2 W to about 200 W. The micro power source in this aspect can include a microturbine engine configured to generate electricity. Additionally, or alternatively, the micro power source can include a fuel cell having a fuel cartridge and a combustion chamber, the fuel cartridge being configured to hold a supply of fuel, the combustion chamber being configured to receive and combust the fuel to generate the energy. Additionally or alternatively, the supply of fuel can generate an electrochemical reaction to generate the energy. Additionally, or alternatively, the supply of fuel can generate an electrochemical reaction to generate the energy. In this aspect, the fuel cartridge is configured to be refillable with a replacement supply of fuel. Additionally, or alternatively, the fuel cartridge can be a replaceable fuel cartridge.

The liquid dispenser in this aspect of the invention can also include a controller in communication with the micro power source, the controller being configured to activate the micro power source to generate the energy. The controller can be a conductivity contact configured to activate the micro power source by a user touch. Additionally, the controller can be configured to adjust a temperature of the liquid and the skin care composition. The controller can be further configured to control a level of electrical power produced by a fuel cell. Moreover, the controller can be configured to selectively apply the energy to a portion of the liquid and the skin care composition about to be dispensed.

Further in this aspect of the invention, the liquid dispenser can include an electrical device in communication with the micro power source, the electrical device disposed proximate the chamber and configured for heating at least one of the liquid and the skin care composition. In this aspect, the electrical device can be a heating element.

Also in this aspect of the invention, the liquid dispenser can include an actuator interposed between the chamber and the orifice, the actuator being configured to release the liquid and the skin care composition from the chamber through the orifice.

Other aspects and advantages of the invention will be apparent from the following description and the attached drawings, or can be learned through practice of the invention.

BRIEF DESCRIPTION OF THE DRAWINGS

The above and other aspects of the present invention will be apparent from the detailed description below and in combination with the drawings in which.

DETAILED DESCRIPTION OF THE INVENTION

Figure 1:
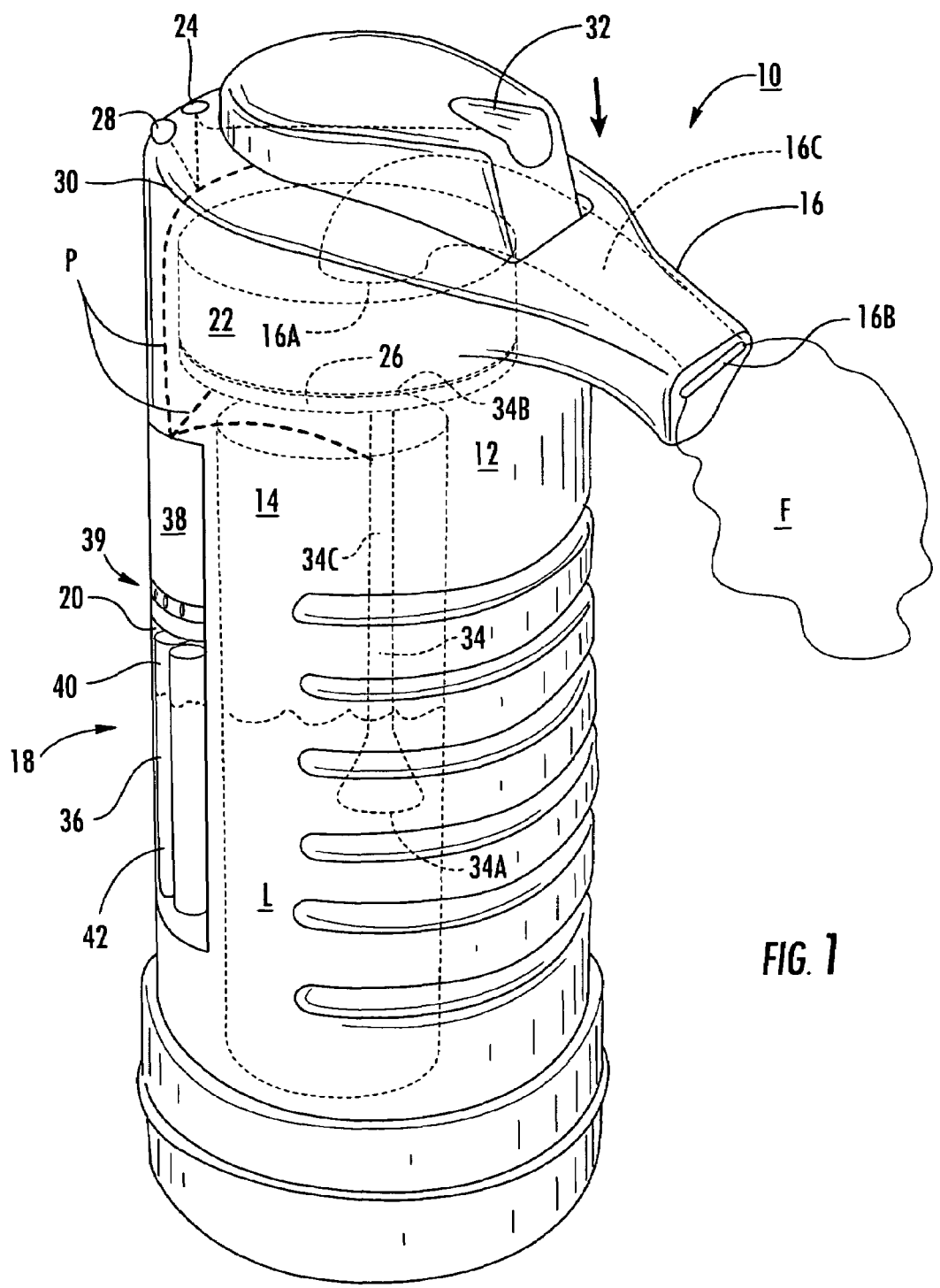
FIG. 1 is a top perspective view of a dispenser powered by a micro power source according to one embodiment of the invention.

Detailed reference will now be made to the drawings in which examples embodying the present invention are shown. The detailed description uses numerical and letter designations to refer to features of the drawings. Like or similar designations in the drawings and description have been used to refer to like or similar parts of the invention.

The drawings and detailed description provide a full and detailed written description of the invention and the manner and process of making and using it, so as to enable one skilled in the pertinent art to make and use it. The drawings and detailed description also provide the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

As broadly embodied in the figures, a skin care dispensing device employing a micro power source is provided. The skin care dispensing device is used to produce heated foam or lotion for skin comfort. The skilled artisan will instantly recognize that the skin care dispensing device and its components including their materials, combinations and dimensions, which are described in detail below, are modifiable to accommodate various requirements and are not limited to only those examples shown in the figures.

As shown in FIG. 1, a first embodiment of a pump or dispenser is designated in general by the element number 10. The dispenser 10 generally includes a body or housing 12, a reservoir 14, a nozzle 16 and a micro power source 18. The micro power source 18 in this aspect of the invention includes a microfuel cell 36, which has a combustion or reaction chamber 38 and a fuel cartridge 40 for storing a quantity of fuel 42. The fuel cartridge 40 is shown without a cover for clarity. The fuel cartridge 40 may be disposed at a higher elevation than the reaction chamber 38 during normal use in order to permit gravitational feed of the fuel 42 to the reaction chamber 38, if desired, although micro pumps, capillary pressure, or other methods may be used to deliver the fuel 42 in other embodiments. Further details of the microfuel cell 36 and its operation are provided in detail below.

The housing 12 of the dispenser 10 shown in FIG. 1 more particularly includes a compartment 20 for housing the microfuel cell 36. As shown, the compartment 20 and the reaction chamber 38 are connected to a conversion chamber 22. The conversion chamber 22 is formed in the housing 12 for receiving a liquid L held in the reservoir 14. More particularly, the liquid L is delivered into the conversion chamber 22 via a conduit 34, which has a first end 34A for drawing the liquid L into the conversion chamber 22 via a second end 34B and a passageway 34C of the conduit 34 in this aspect of the invention. The liquid L is converted to foam F in this example and heated by a resistor 26 either before or after conversion to foam. Conversion to foam can be achieved in a variety of ways such as by mechanical aspiration combining a fluid and air. Without intending any limitation on the kinds of foaming devices that may be employed in various embodiments of the invention described herein, an exemplary foamer that can be used is the F2 PUMPFOAMER brand foamer manufactured and marketed by Airspray International Inc. of Pompano Beach, Fla. This device is actuated by a push button and supplies, for example, 0.75 ml+/−0.05 ml of composition per stroke or push. The consumer can of course control the amount of foam produced by the foamer by the number of strokes of the push button. The F2 PUMPFOAMER is similar in design and operation to propellantless, finger-actuated, mechanical pump foamers, such as those described in U.S. Pat. No. 5,443,569, issued on Aug. 22, 1995, and U.S. Pat. No. 5,813,576, issued Sep. 29, 1998, both of which are incorporated by reference herein without limitation to the present invention.

As shown in FIG. 1, a controller 24 is connected to the resistor 26 by way of electrical power lines P, which deliver an electrical current from the reaction chamber 38 to the resistor 26 to heat the foam F. Also shown, the controller 24 is attached to a cap 30 of the housing 12. The cap 30 is snap-fitted, screwed or hinged to the housing 12 and can be removed to refill the reservoir 14 with the liquid L. Although this example shows the reaction chamber 38 electrically connected to the resistor 26 to heat the foam F, the skilled artisan will instantly recognize that the reaction chamber 38 can be connected directly to the conversion chamber 22. Accordingly, energy produced by the microfuel cell 36 can be in the form of heat to heat the foam F in the conversion chamber 22 directly instead of or in addition to the electrical resistor 26.

The nozzle 16 shown in FIG. 1 includes a first end 16A connected to a second end or orifice 16B by a passageway 16C. When an actuator 32 is depressed in a direction indicated by the bold arrow, the first end 16A draws the heated liquid L from the chamber 22 by creating a vacuum in the chamber 22. After the liquid L is converted to the foam F and heated or otherwise treated in the chamber 22 as noted above, the foam F is dispensed through the passageway 16C and out the orifice 16B for use by a user. The actuator 32 can control a release rate of the dispensed foam F such that the user only releases a predetermined quantity per each depression. Moreover, the actuator 32 can open the orifice 16B only after the foam F reaches a desired temperature comfortable to the user. Likewise, the actuator 32 can prevent the foam F from being released at an uncomfortably high temperature.

As further shown in FIG. 1, one or more indicators 28 such as an LED or other light or audible device can be attached to the housing 12 and connected to the power source 18 by one of the power lines P. The indicator 28 can be used to indicate when the fuel cell 36 is running low on fuel 42 or when the reservoir 14 is running low on the liquid L. Furthermore, the indicator 28 can be used to indicate when the foam F has been heated to a desired temperature in the chamber 22 for dispensing through the orifice 16B.

Figure 2:
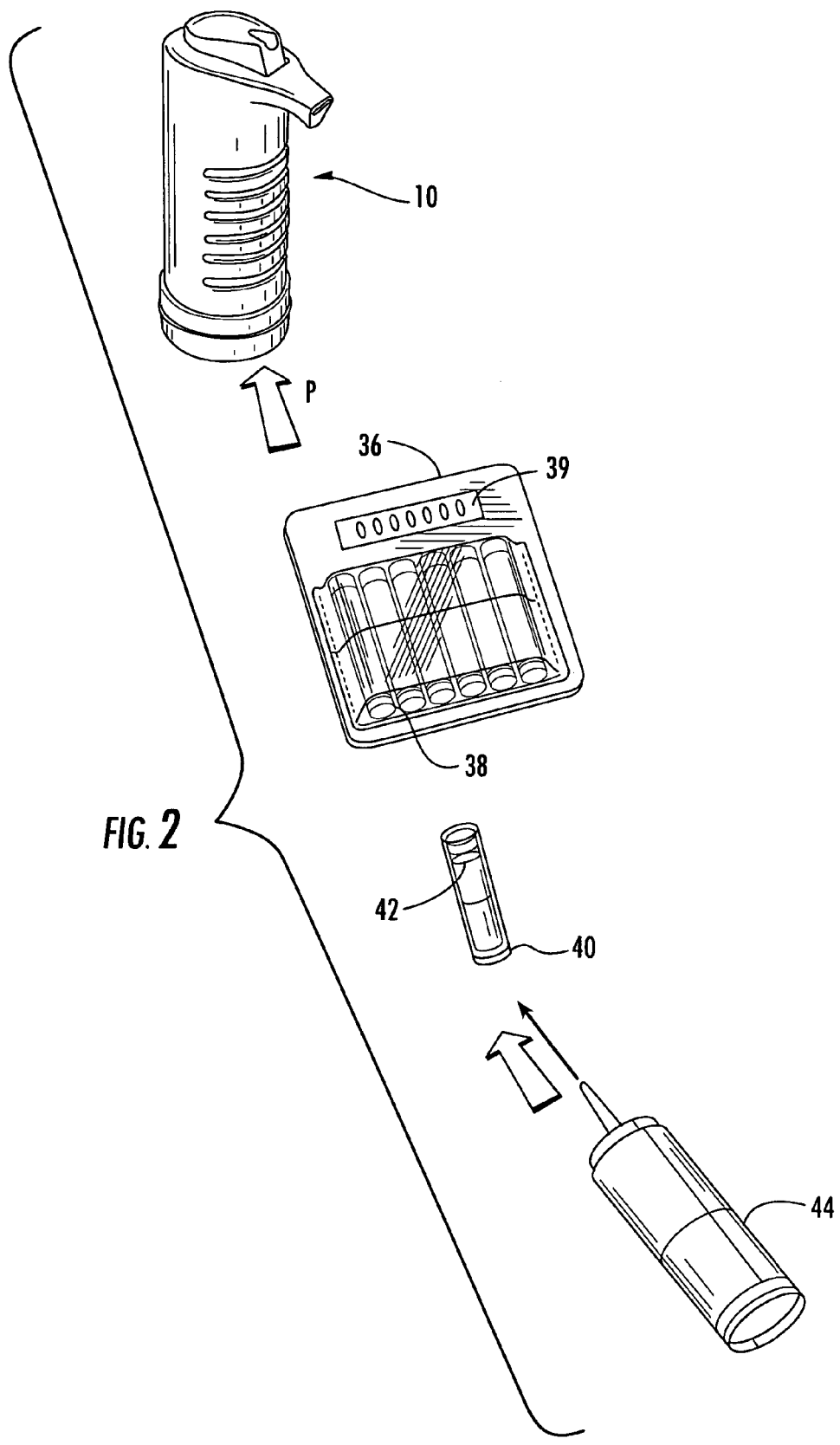
FIG. 2 is an exploded view of a reusable micro power source being inserted in a dispenser as in FIG. 1 according to an aspect of the invention.

With reference to FIGS. 1 and 2, the micro-fuel cell 36 can have an air intake 39 to allow air in the atmosphere to be in fluid communication with the internal fuel cell. The air intake 39 can include a gas pervious material such as a fibrous web or other filter, a porous membrane, an apertured solid, a grill, a plurality of slots or other openings in the micro-fuel cell 34. In one aspect, the air intake 39 is provided with a water repellent mechanism, device or coating to prevent water being used for shaving, for instance, from accidentally flooding the internal fuel cell. For example, the air intake 39 can have a hydrophobic barrier such as a hydrophobic web (woven or nonwoven), an apertured film, a porous membrane, and the like, which are suitable for resisting the in-flow of the water.

FIG. 2 most clearly shows the microfuel cell 36. In this aspect of the invention, the microfuel cell 36 includes the combustion chamber 38, the fuel cartridge 40 and the air intake 39 as briefly introduced above. As shown, the fuel cartridge 40 holds the fuel 42, which upon activation of the actuator 32 for instance, will deliver the fuel 42 into the combustion chamber 38 for combustion. Alternatively, the fuel 42 undergoes an electrochemical reaction in which electrons are transferred in a manner to create the electricity as described in greater detail with respect to FIG. 3 below. As noted above, the electricity is delivered to the various components via the electrical lines P. As further shown in FIG. 2, the fuel cartridge 40 can be refilled with a subsequent quantity of fuel 42 using a refueling device 44, or the fuel cartridge 40 can be removed and replaced in its entirety with a new fuel cartridge after the fuel 42 is depleted from the original fuel cartridge 40.

Although the air intake 39 described above and shown most clearly in FIG. 2 can be on an uppermost surface of micro-fuel cell 36, the skilled artisan will instantly appreciate that the air intake 39 can be positioned along one or more sides or a bottom area of the micro-fuel cell 36. Further, multiple air intakes having a variety of geometries can be provided. Thus, the invention is not limited to the exemplary air intake 39 as shown in FIG. 2.

Figure 3:
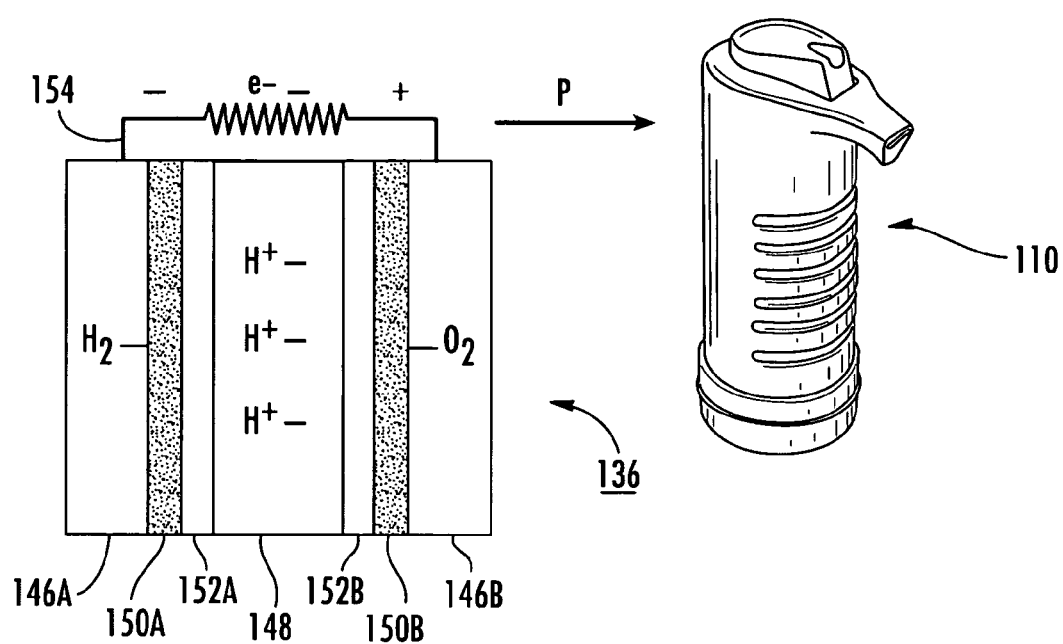
FIG. 3 is a schematic diagram of a micro fuel cell according to another aspect of the invention.

FIG. 3 shows an alternative embodiment of a microfuel cell 136, which can be used to power a shaving cream dispenser 110, similar to the dispenser 10 discussed above, or a lotion dispenser 310 as will be described with respect to FIG. 6 below. As shown in the cross-section of FIG. 3, the microfuel cell 136 is "sandwiched" together to serve as a gas delivery structure for a fuel, for example hydrogen gas $H_2$, and for an oxidant (e.g., $O_2$). More particularly, the microfuel cell 136 contains an anode current collector 146A and a cathode current collector 146B, which can both be formed, for instance, from a graphite block with machine paths thereon (not shown) for directing the fuel or the oxidant. In this aspect, graphite cloths 150A,B are provided to allow for gas diffusion from the current collectors 146A,B to a centrally located proton exchange membrane 148 having catalyst films 152A,B formed on each side of the exchange membrane 148. In this example, platinum is used to form the catalyst films 152A,B.

As indicated in FIG. 3, the hydrogen gas fuel $H_2$ moves through the machine paths in the anode current collector 146A, diffuses through the graphite cloth 150A and contacts the catalyst layer 152A. The catalyst strips electrons $e^-$ from the fuel $H_2$, and the electrons $e^-$ then travel through an external circuit 154. The remaining positive ions $H^+$ travel through the membrane 148 to the second catalyst layer 152B where they combine with oxygen ions formed when the free electrons $e^-$ travel from the circuit 154 and combine with the oxidant fed through the machine channels of the cathode current collector 146B. One byproduct of this process is electricity generated by the electron flow. Similar to the embodiment above, the electricity in this example is connected to and powers the dispenser 110 via a power line P. Other byproducts of the process are heat and water. The heat can be recycled with the water to produce a water vapor, which can be combined with the foam F for emission from an orifice, such as orifice 16B as described above with respect to FIG. 1.

Figure 4:
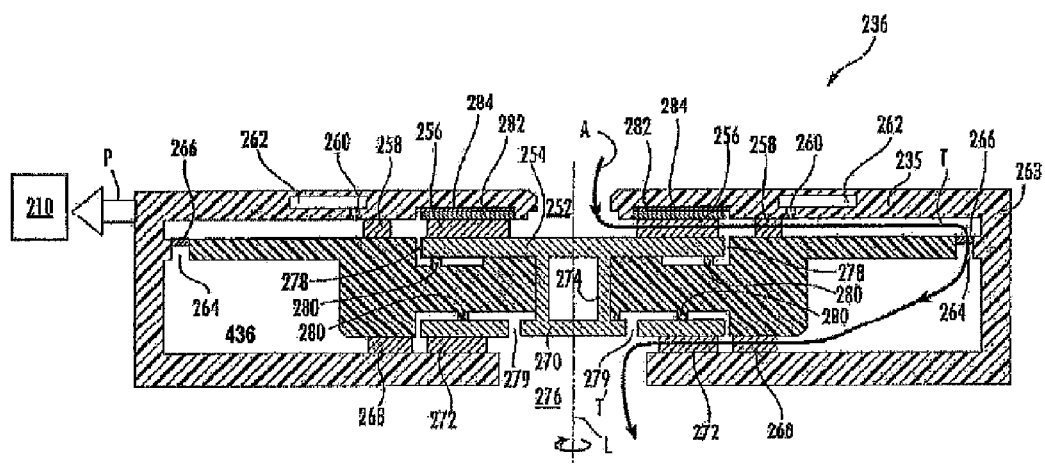
FIG. 4 is an elevational view of a micro power source in cross section in accordance with another aspect of the invention.
Figure 5:
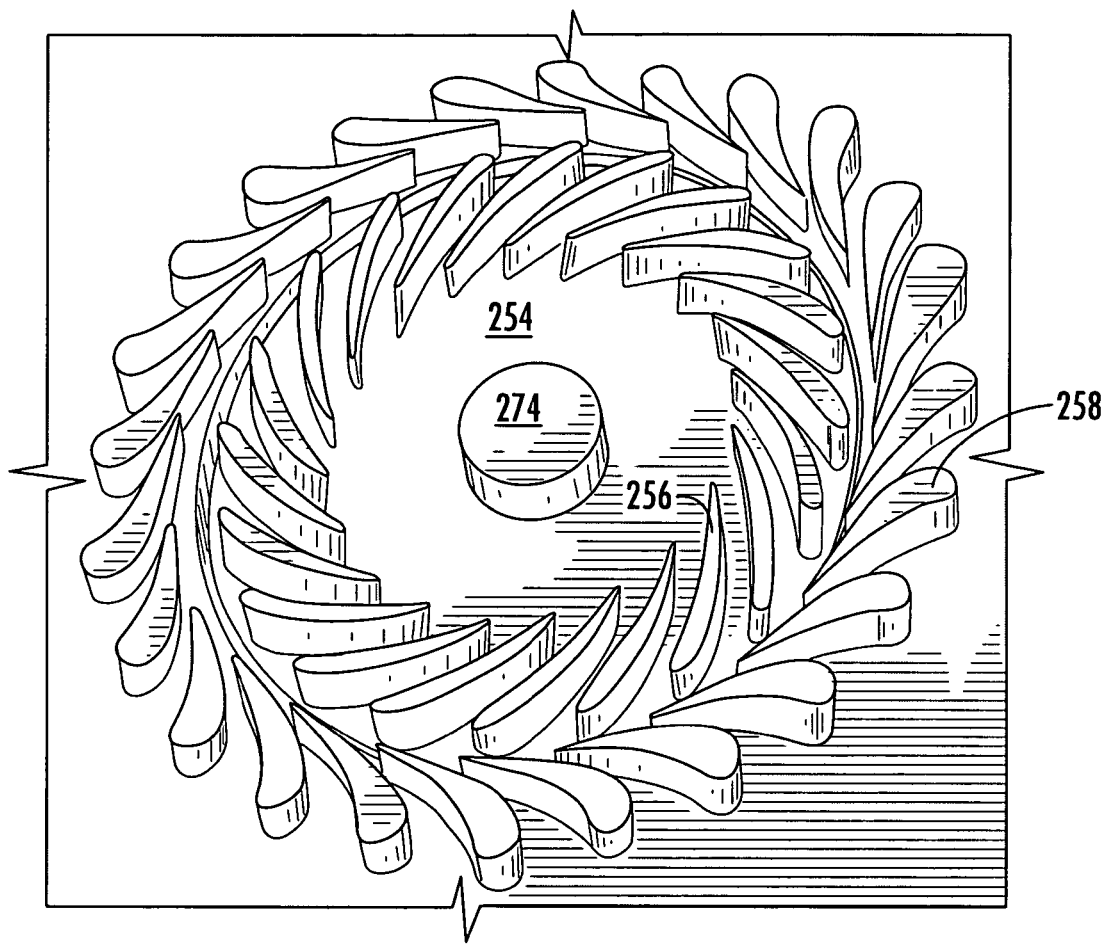
FIG. 5 is a top perspective view of a microturbine as used in the micro power source of FIG. 4.

Turning now to FIGS. 4 and 5, an alternative embodiment of a micro power source is used to power a shaving cream dispenser 210 such as dispenser 10 described above, the lotion dispenser 310 to be described below or the like. In this aspect of the invention, the micro power source is a micro gas turbine engine or microengine 236, which generally includes a plurality of fixed diffuser vanes 258 disposed about a plurality of rotating compressor blades 256. In this example, the microgas turbine engine 236 is about 12 millimeters in diameter and about 3 millimeters in thickness and employs an air inlet 252 defining an area of about 1 $mm^2$. By way of exemplary operation, air A enters the microgas turbine engine 236 along a central line L defined through the inlet 252. As shown, the air A turns radially outward and is compressed in a centrifugal, planar microcompressor described below. Although only one air path A is apparent in FIG. 4 for clarity, the skilled artisan will appreciate that a continuous air path exists around a circumference of the microengine 236 and through its various components as more clearly shown in FIG. 5.

FIGS. 4 and 5 further show that the microcompressor includes a compressor rotor disk 254 that is approximately 4 millimeters in diameter in this example, including the radial-flow rotor blades 256, which are about 250 micrometers in this example. As shown, the compressor rotor disk 254 is connected to a shaft 274 that is radially journaled for spinning, which in turn spins the compressor rotor disk 254 and the blades 256. Also shown, the plurality of stationary diffuser vanes 258 is located just beyond a radial periphery of the compressor rotor disk 254. Thus, the air A passing through the compressor rotor blades 256 exits the rotor with a large angular momentum that is removed by the vanes 258 in the diffuser and converted to a static pressure rise.

More specifically, fuel (not shown) is injected at the discharge of the compressor rotor disk 254 by way of a fuel injector 260, which is formed of a circular array of, e.g., about 100-200 fuel-metering orifices on the microengine housing 263. As shown, the injected fuel mixes with the air A while flowing radially outward. The fuel injectors 260 are supplied by, e.g., an annular supply plenum 262 that is connected to an external fuel tank such as the fuel cartridge 40 described above.

The air-fuel mixture of FIG. 4 traverses a diffuser region and then turns (indicated by the letter T) through about 90° to axially traverse a periphery of small holes; i.e., the combustor inlet ports 264 that define flame holders provided in the region between the ports 264. A plurality of combustion igniters 266, e.g., resistive heaters controlled to the auto-ignition temperature of the air-fuel mixture, is located at a number of the combustion inlet ports 264 to initiate combustion of the air-fuel mixture. The ignited mixture axially enters an annular microcombustion chamber 436 where the mixture is fully combusted. In this example, the microcombustion chamber 435 is between about 2 millimeters-10 millimeters in annular height and between about 0.5 millimeters-5.5 millimeters-long measured axially.

FIGS. 4 and 5 further show that the expanding exhaust gases from the microcombustion chamber 436 are discharged radially inward through stationary turbine guide vanes 268 to a planar radial inflow microturbine rotor disk 272. The turbine rotor disk 272 diameter can be substantially similar to that of the compressor rotor disk 254. Like the microcompressor, the turbine rotor disk 272 includes axial blades similar in height to those of the compressor rotor 254. As shown, the turbine disk 272 is connected by way of the journaled shaft 274 to the compressor disk 254 and thus rotationally drives the microcompressor in response to combustion gases exhausted through the microturbine blades that cause the turbine disks to spin. Specifically, as discussed above, the microturbine is exhausted radially inward where the exhaust gas then turns T' axially, leaving the microengine 236 through an exhaust nozzle 276. Thus, the turbine rotor disk 272 can operate as a microgenerator for driving power electronics via the power line P that in turn drives an electrical load such as the resistor 26 introduced above.

Figure 6:
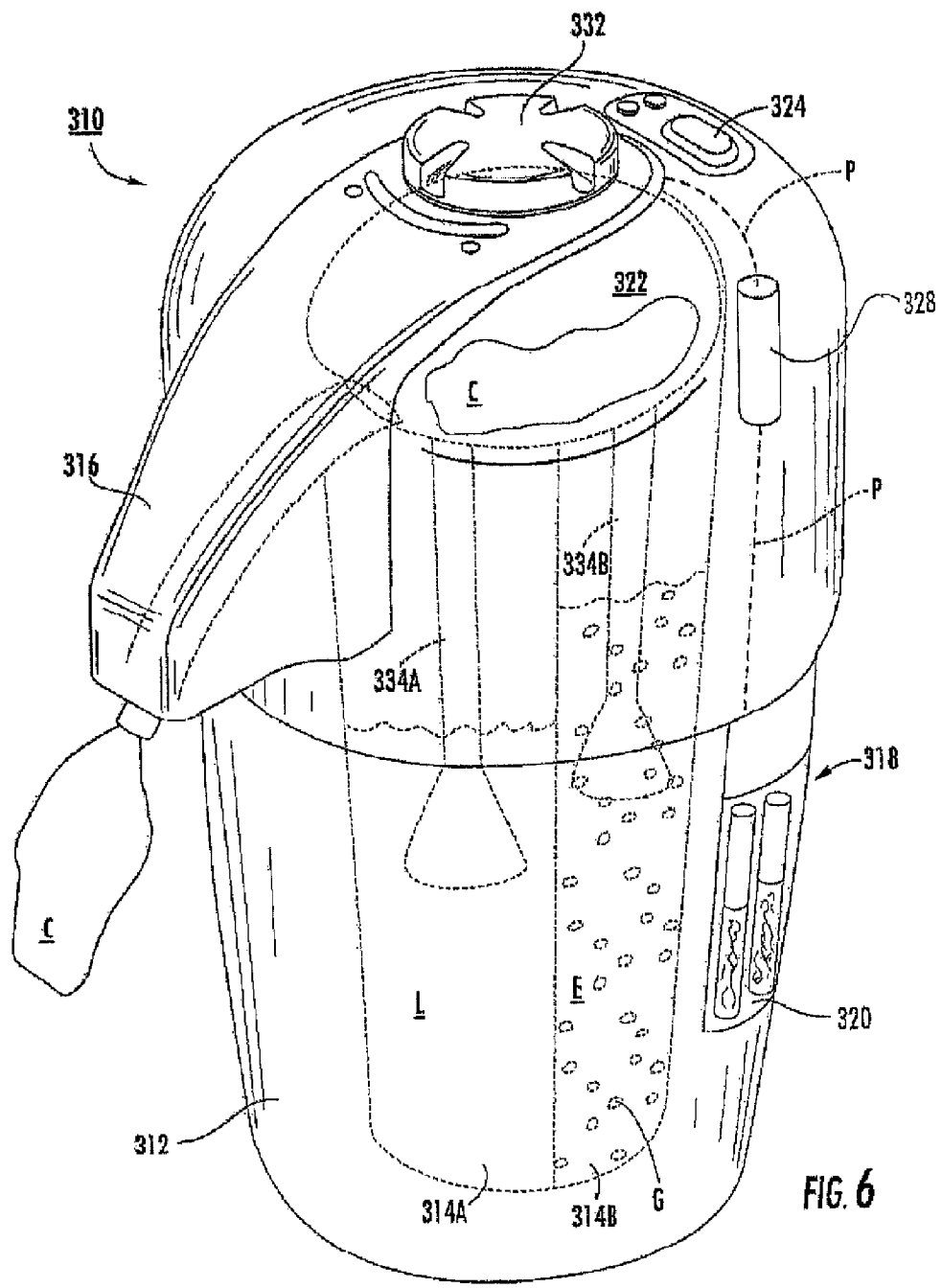
FIG. 6 is a perspective view of a dispenser powered by a micro power source according to another embodiment of the invention.

Turning now to FIG. 6, an alternative embodiment according to the invention is shown in which the briefly introduced dispenser 310 broadly includes a housing 312 to which a micro power source 318 is connected. As shown, the housing 312 includes a compartment 320 for holding the micro power source 318. Also shown, the housing 312 has a chamber 322, which is connected to a first reservoir 314A and to a second reservoir 314B in this example. Some aspects of this embodiment of the invention are similar to the foregoing embodiments; therefore, certain aspects are described below and reference is made to the foregoing embodiments for a full and enabling disclosure of this embodiment of the invention.

More particularly, FIG. 6 shows that a liquid L is held in the first reservoir 314A and is delivered to the chamber 322 via a conduit 334A. An encapsulated skin care composition E is held in the second reservoir 314B for delivery into the chamber 322 via a conduit 334B. By way of example operation, when a user depresses an actuator 332, the conduits 334A, B respectively draw the liquid L and the composition E into the chamber 322 such as by creating a vacuum; i.e., a relatively lower pressure in the chamber 322 and a relatively higher pressure in the first and second reservoirs 314A, B. As shown, a resistor 328, which is connected by a power line P to the micro power source 318, is activated to heat the liquid L and the composition E to a comfortable temperature for application to the user's skin. In this aspect of the invention, the encapsulated composition E is heated to a temperature that will, for instance, break down a gelatin capsule G holding the skin care composition E thus activating the encapsulated composition E. For instance, heat generated by the resistor 328 can melt the gelatin capsule G to release the composition E for mixing with the liquid L to create a mixture C for delivery to the user from a nozzle 316 as shown. The skilled artisan will appreciate that the user can, for instance, use a controller 324 to set a preferred temperature for the mixture C or to release only one of the liquid L or the composition E.

While preferred embodiments of the invention have been shown and described, those skilled in the art will recognize that other changes and modifications may be made to the foregoing embodiments without departing from the spirit and scope of the invention. For example, specific fuels described above and various devices and their shapes and materials and placement can be modified to suit particular applications. It is intended to claim all such changes and modifications as fall within the scope of the appended claims and their equivalents.

That which is claimed is:

1. A liquid dispenser, comprising:
   a reservoir being configured to hold a liquid;
   a conversion chamber in communication with the reservoir, the conversion chamber being configured to receive the liquid;
   a power source having a reaction chamber;
   the power source being configured to generate energy for heating of the liquid disposed in the conversion chamber;
   the reaction chamber affixed to the conversion chamber wherein the reaction chamber directly heats the conversion chamber; and
   a nozzle defining an orifice there through in selective communication with the conversion chamber, the nozzle being configured for releasing the heated liquid from the conversion chamber through the orifice.

2. The liquid dispenser as defined in claim 1, wherein the liquid is selected from the group consisting of a quantity of lotion, a quantity of skin care composition, a quantity of shaving cream and combinations thereof.

3. The liquid dispenser as defined in claim 1, wherein the micro power source is configured to generate about 0.2 W to about 200 W.

4. The liquid dispenser as defined in claim 1, wherein the micro power source is a fuel cell having a fuel cartridge and a combustion chamber, the fuel cartridge being configured to hold a supply of fuel, the combustion chamber being configured to receive and combust the fuel to generate the energy.

5. The liquid dispenser as defined in claim 4, wherein the fuel cartridge is configured to be refillable with a replacement supply of fuel.

6. The liquid dispenser as defined in claim 4, wherein the fuel cartridge is a replaceable fuel cartridge.

7. The liquid dispenser as defined in claim 1, further comprising a controller in communication with the micro power source, the controller being configured to activate the micro power source to generate the energy.

8. The liquid dispenser as defined in claim 7, wherein the controller is a conductivity contact being configured to activate the micro power source by a user touch.

9. The liquid dispenser as defined in claim 7, wherein the controller is configured to adjust a temperature of the liquid.

10. The liquid dispenser as defined in claim 7, wherein the controller is configured to control a level of electrical power produced by a fuel cell.

11. The liquid dispenser as defined in claim 7, wherein controller is configured to selectively apply the energy to a portion of the liquid about to be dispensed.

12. The liquid dispenser as defined in claim 1, further comprising an electrical device in communication with the micro power source, the electrical device disposed proximate the conversion chamber and configured for heating the liquid.

13. The liquid dispenser as defined in claim 12, wherein the electrical device is a heating element.

14. The liquid dispenser as defined in claim 1, further comprising an actuator interposed between the conversion chamber and the orifice, the regulator being configured to release the liquid from the conversion chamber through the orifice.

15. A liquid dispenser, comprising:
a first reservoir being configured to hold a liquid;
a second reservoir being configured to hold a skin care composition;
a conversion chamber in communication with the first and the second reservoirs, the conversion chamber being configured to receive the liquid and the skin care composition for mixing of the liquid and the skin care composition;
a micro power source having a reaction chamber and the micro power source being configured to generate energy for conversion of at least one of the liquid and the skin care composition disposed in the conversion chamber;
the reaction chamber affixed to the conversion chamber wherein the reaction chamber directly heats the conversion chamber; and
a nozzle defining an orifice there through in selective communication with the conversion chamber, the nozzle being configured for releasing the liquid and the skin care composition from the conversion chamber through the orifice.

16. The liquid dispenser as defined in claim 15, wherein the liquid is selected from the group consisting of a quantity of shaving cream, a quantity of lotion and combinations thereof.

17. The liquid dispenser as defined in claim 15, wherein the skin care composition is selected from the group consisting of a quantity of water, a quantity of fragrance, a quantity of thermoactivated dye, a quantity of wax and combinations thereof.

18. The liquid dispenser as defined in claim 15, wherein the micro power source is configured to generate about 0.2 W to about 200 W.

19. The liquid dispenser as defined in claim 15, wherein the micro power source is a fuel cell having a fuel cartridge and a combustion chamber, the fuel cartridge being configured to hold a supply of fuel, the combustion chamber being configured to receive and combust the fuel to generate the energy.

20. The liquid dispenser as defined in claim 19, wherein the fuel cartridge is configured to be refillable with a replacement supply of fuel.

21. The liquid dispenser as defined in claim 19, wherein the fuel cartridge is a replaceable fuel cartridge.

22. The liquid dispenser as defined in claim 15, further comprising a controller in communication with the micro power source, the controller being configured to activate the micro power source to generate the energy.

23. The liquid dispenser as defined in claim 22, wherein the controller is a conductivity contact being configured to activate the micro power source by a user touch.

24. The liquid dispenser as defined in claim 22, wherein the controller is configured to adjust a temperature of the liquid and the skin care composition.

25. The liquid dispenser as defined in claim 22 wherein the controller is configured to control a level of electrical power produced by a fuel cell.

26. The liquid dispenser as defined in claim 22, wherein the controller is configured to selectively apply the energy to at least one of a portion of the liquid and the skin care composition.

27. The liquid dispenser as defined in claim 15, further comprising an electrical device in communication with the micro power source, the electrical device disposed proximate the conversion chamber and configured for heating at least one of the liquid and the skin care composition.

28. The liquid dispenser as defined in claim 27, wherein the electrical device is a heating element.

29. The liquid dispenser as defined in claim 15, further comprising an actuator interposed between the conversion chamber and the orifice, the actuator being configured to release the liquid and the skin care composition from the conversion chamber through the orifice.

* * * * *